F. BOLDUC.
Corn-Planters.
No. 154,213.  Patented Aug. 18, 1874.
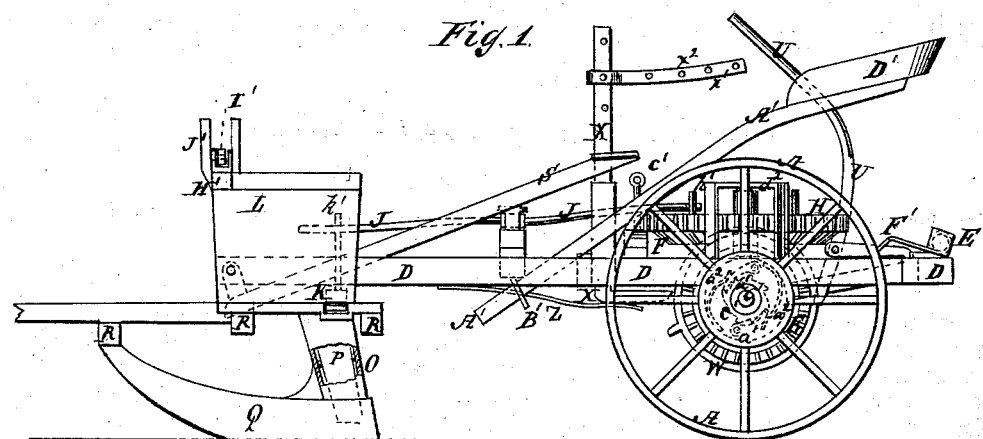
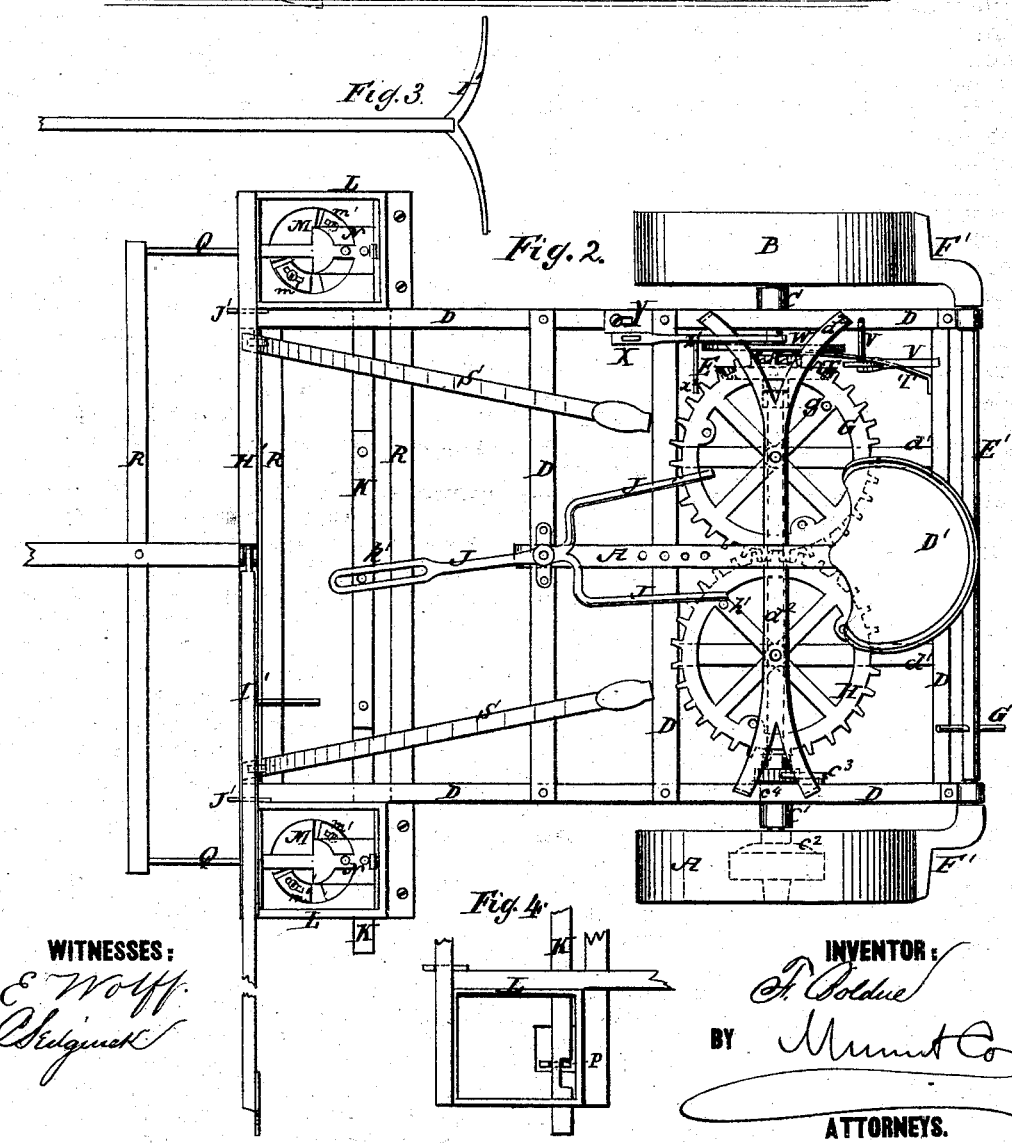

UNITED STATES PATENT OFFICE.

FRANCIS BOLDUC, OF ST. ANNE, ILLINOIS, ASSIGNOR TO JOSEPH DALPAY, OF SAME PLACE.

IMPROVEMENT IN CORN-PLANTERS.

Specification forming part of Letters Patent No. 154,213, dated August 18, 1874; application filed June 13, 1874.

*To all whom it may concern:*

Be it known that I, FRANCIS BOLDUC, of St. Anne, in the county of Kankakee and State of Illinois, have invented a new and useful Improvement in Corn-Planter, of which the following is a specification:

Figure 1 is a side view of my improved corn-planter. Fig. 2 is a top view of the same. Fig. 3 is a detail view of the guide or indicator. Fig. 4 is a top view of one of the hoppers, the cut-off plate and dropping-disk being removed.

Similar letters of reference indicate corresponding parts.

The invention consists in the construction and arrangement of parts, as hereinafter described, and specifically indicated in the claims.

A B are the drive-wheels. The hub of the drive-wheel A is made large, and its inner end is recessed to receive the pawls $a^1$ and the springs $a^2$, by which they are held against the small ratchet-wheel $c^1$, rigidly attached to the axle C at the inner end of its journal. The cavity or recess in the end of the hub is closed, to keep out sand and mud and to protect the said pawls and springs, by a collar or flange, $c^2$, rigidly attached to the said axle C. The axle C revolves in bearings attached to the frame D of the planter, so that as the machine is drawn forward the drive-wheel A may carry the axle C with it in its revolution. As the wheel A is turned backward the pawls $a^1$ slip over the teeth of the ratchet-wheel $c^1$, and the axle C is kept from being turned back by friction by the pawl $c^3$, attached to the side bar of the frame D, and which takes hold of the teeth of a ratchet-wheel, $c^4$, attached to the said axle C. The other drive-wheel, B, revolves loosely upon the axle C. Upon the axle C, near one end, is placed a bevel-gear wheel, E, which revolves loosely upon said axle, and the teeth of which mesh into the teeth of the bevel-gear wheel F, formed upon or rigidly connected with the gear-wheel G, the teeth of which mesh into the teeth of an equal gear-wheel, H. The lower ends of the journals of the two gear-wheels G H work in bearings attached to two longitudinal bars, $d^1$, attached to the cross-bars of the frame D. The upper ends of the journals of the gear-wheels G H revolve in bearings in a metallic cross-bar, $d^2$, the ends of which are forked, are bent downward, pass through holes in the side bars of the frame D, and are secured by nuts screwed upon their projecting ends. Upon the outer end of the hub of the loose bevel-gear wheel E are formed teeth, for the teeth of the sliding clutch I to take hold of, so that the axle C may carry the said bevel-gear wheel E with it in its revolution, and thus give motion to the gear-wheels G H. To the upper side of the gear-wheels G H are attached two pins, $g'$ $h'$, in such positions as to strike alternately the rear ends of the forks of the lever J at each revolution of the said gear-wheels G H, and thus oscillate said lever. The lever J is pivoted, at or near its middle part, to a cross-bar of the frame D, and in its forward end is formed a longitudinal slot to receive the pin $k'$, attached to the center of the slide-bar K, the ends of which enter the seed-hoppers L, and have pins attached to them to enter slotted lugs formed upon the edges of the dropping-disks M, and operate them to drop the corn. The disks M are pivoted to the bottoms of the hoppers L, and in them, upon the opposite sides of their pivots, are formed curved slots, in which are secured blocks $m'$, so that by adjusting said blocks the size of the dropping-openings, and consequently the number of kernels dropped at a time, may be regulated at will. N are cut-off plates, placed in the lower parts of the hoppers L, above the dropping-disks M, to prevent any more corn than enough to fill the dropping-cavity from passing out at a time. The seed escapes from the dropping-disks M into the conductor-spouts O, where it is received upon a valve-plate, P, which is placed longitudinally in the spouts O, and is pivoted at its middle part to the middle part of the said spouts. The upper ends of the valve-plates P are connected with the slide-bar K, so that it may be shifted to drop the seed at each movement of said slide-bar. The lower ends of the spouts O are secured in and to the forked rear ends of the openers Q, the forward parts of which are curved upward like a sled-runner, and their ends are attached to the front cross-bar of the frame R, to the ends of which the hoppers L are attached, and which is pivoted to the forward ends of the side bars of the frame D. To the frame R are rigidly attached the forward ends of the levers S, the rear ends of which project back into such a position that the driver from his seat may put his feet upon them, and thus press the openers deeper into the ground when necessary. The clutch I is moved and held against the bevel-gear wheel E by a spring, T, the forward end of which is forked, to enter a ring-groove formed in said clutch, and its rear end is attached to the frame D. U is a bent lever pivoted to a support, V, attached to the frame D, in such a position that when the said lever is operated its lower end may push the spring T back, which carries the clutch I with it. As the lever U is withdrawn the elasticity of the spring T throws the clutch I into gear with the bevel-gear wheel E. To the clutch I is rigidly attached, or upon it is formed, a wheel, W, which is provided with a single tooth, which, at each revolution of the said wheel W, strikes against the bent lower end of the bar X, which slides up and down in a keeper, Y, attached to the frame D, and is held up by a spring, Z, also attached to the frame D, except when forced down by the tooth of the wheel W. The keeper Y is secured to the frame D by a bolt, which passes through a slot in said keeper, so that the bar X may be moved back out of the reach of the tooth of the wheel W when desired. To the upper end of the bar X is attached a rearwardly-projecting arm, $x^1$, several holes being formed in the upper end of the bar X, to receive the attaching-pin, so that the arm may be conveniently raised and lowered, as desired. In the arm $x^1$ are formed a number of holes to receive a pin, $x^2$, which projects inward in front of the driver, so that he can readily see the downward movement of the bar X, and thus know the exact space passed over by the machine while the dropping device is out of gear. This enables the driver to throw the dropping device out of and into gear at such times as will cause the hills to be planted in perfect check-row.

When not required for use the pin $x^2$ may be removed from the arm $x^1$, and inserted in one of the holes in the inclined standard A', so as to be out of the way.

The standard A' rests in an inclined position upon the upper side of a cross-bar of the frame D, and its lower end passes through a keeper, B', attached to another cross-bar of said frame D, where it is secured in place by a pin, C', that passes through it and through the cross-bar upon which it rests.

Several holes are formed in the standard A' to receive the pin C', so that it may be adjusted to bring the weight of the driver more or less directly over the axle, as may be desired. To the upper end of the standard A' is attached the driver's seat D'. In bearings attached to the rear end of the frame D works a shaft, E', to the ends of which are attached scrapers F', which project forward and outward, so as to rest upon the faces of the drive-wheels A B, and scrape off any mud that may adhere to them, and which may be turned back from the said wheels when not required for use. The roller or shaft E' is operated by a lever, G', which should extend so far forward that it may be reached and operated by the driver with his foot. This enables the scrapers F' to be used as a brake when desired.

To the tops of the hoppers L are attached the ends of a cross-bar, H', to the center of which is hinged or swiveled the end of a bar, I', the other end of which is forked, as shown in Fig. 3, so that it may be turned to either side, to indicate when the machine is at the proper distance from the row last planted. The indicator I' is kept in position at right angles with the length of the machine by being dropped into notched or slotted standard J', attached to the hoppers L.

Having thus described my invention, I claim as new and desire to secure by Letters Patent—

1. The combination of the vertical bar X, bent at its lower end, and having arms, as specified, the spring-support Z, and single-toothed wheel W, as shown and described, to operate as set forth.

2. The horizontal meshing gears G and H, having vertical pins $g'$ $h'$, the vertical gear E, fixed on the axle, the pivoted forked and slotted lever J, and slide K, combined and arranged to operate as shown and described.

FRANCIS <sup>his</sup> × <sup>mark.</sup> BOLDUC.

Witnesses:
GODFROY FORTIER,
M. LETELLUR.